United States Patent [19]

Noh

[11] Patent Number: 4,696,147

[45] Date of Patent: Sep. 29, 1987

[54] FILM TUBING DEVICE FOR USE IN PACKAGING APPARATUS

[75] Inventor: Chuji Noh, Sakai, Japan

[73] Assignee: Tokiwa Kogyo Co., Ltd., Japan

[21] Appl. No.: 943,932

[22] Filed: Dec. 19, 1986

[51] Int. Cl.$^4$ .............................................. B65B 9/06
[52] U.S. Cl. ....................................... 53/550; 53/373; 156/466; 156/498; 156/555
[58] Field of Search .................. 53/373, 550, 562, 575, 53/578, 551; 156/218, 466, 498, 555

[56] References Cited

U.S. PATENT DOCUMENTS

| 2,934,130 | 4/1960 | Lane et al. | 156/466 X |
| 3,340,129 | 9/1967 | Grevich | 53/562 X |
| 3,488,244 | 1/1970 | Lepisto | 53/373 X |
| 3,729,089 | 4/1973 | Kerttula | 156/555 X |
| 3,986,918 | 10/1976 | Berner | 156/466 X |
| 4,526,642 | 7/1985 | Caughey | 156/555 X |
| 4,601,159 | 7/1986 | Mugnai | 53/550 X |

FOREIGN PATENT DOCUMENTS 51-10170  1/1976  Japan .
57-67903  4/1982  Japan .

Primary Examiner—Robert L. Spruill
Assistant Examiner—Steven Weihrouch
Attorney, Agent, or Firm—Birch, Stewart, Kolasch & Birch

[57] ABSTRACT

A film tubing device for use in a packaging apparatus comprising a former arranged in a transfer path of a continuous length of a heat-meltable film, the former including an inner former member on which the film is wrapped with its longitudinal side edges overlapping each other, the former further including an outer former member having a longitudinal outlet through which the overlapping side edges of the film project out, a pair of longitudinal sealers disposed adjacent to the longitudinal outlet as slightly spaced from the outer former member for nipping the overlapping side edges of the film, the sealers being heated for heat-sealing the overlapping side edges of the film, a thin air guide plate arranged between the outer former member and each sealer to define a clearance between the guide plate and the outer former member, and an air supplying nozzle for feeding cooling air into the clearance.

6 Claims, 4 Drawing Figures

FILM TUBING DEVICE FOR USE IN PACKAGING APPARATUS

BACKGROUND OF THE INVENTION

1. Field of the Invention:

This invention relates to a film tubing device for use in a packaging apparatus, and more particularly to improvements in such a film tubing device that is capable of forming a continuous length of a film into a tubular shape for enclosing a plurality of successively supplied articles to be packaged.

In the following description, the term "tube (or tubular)" is used to refer to an elongate hollow body or column which may be optional (circular, oval, rectangular, etc.) in cross section. The term "tube" is also used as a verb to form a film or sheet into a tubular shape.

2. Description of the Prior Art:

In packaging each of successively supplied articles by an enclosure made of a heat-meltable, heat-shrinkable film, it is a common practice to first form a continuous length of such film into a tube surrounding the article with both longitudinal side edges of the film heat-sealed together. Then, the film tube thus formed is transversely heat-sealed and cut at two positions slightly ahead of and behind the article to provide a film container completely enclosing the article. Finally, the film container is subjected to hot air treatment, whereby the film container comes into intimate contact with the article inside.

A film tubing device usable for such packaging operation is disclosed for example in Japanese Utility Model Laid-open No. 51-10170 (Laid-open: Jan. 24, 1976; Application No. 49-82215; Filed: July 10, 1974; Applicant: Ibaragi Seiki Kabushiki Kaisha; Inventor: Sen SUGA). For convenience of explanation, the arrangement of the film tubing device disclosed in this laid-open application is illustrated in FIG. 4 of the accompanying drawings and described hereinbelow.

Referring to FIG. 4, the prior art film tubing device comprises a tube former 100 which includes an inner former member 101 in the form of a channel member and an outer former member 102 in the form of a rectangular tube having a longitudinal bottom outlet 103. A continuous length of a film 104, which is originally flat when paid out from an unillustrated roll, is transferred through the former 100 and thereby formed into a tubular shape with both longitudinal side edges 104a overlapping each other and projecting downward through the outlet 103. A pair of heat rollers 105 (longitudinal sealer) which are rotated by a drive mechanism (not shown) are disposed immediately below the former 100 to nip and heat-seal the overlapping side edges 104a of the film 104. Each of the heat rollers 105 has a circumferential groove 106. A cutter knife 107 is arranged in front of the rollers 105 and has its cutting edge in pressing contact with the circumferential groove 106 of one of the rollers 105, so that residual lower portions of the overlapping side edges 104a are cut away.

It is to be noted that the inner former member 101, which is illustrated in FIG. 4, is in fact not illustrated in the drawings of the laid-open application. However, such inner former member must be provided within the film tube 104 since otherwise the film 104 cannot hold its tubular shape. Further, an article to be packaged must also be present within the inner former member 101 though not illustrated in FIG. 4 nor in the drawings of the laid-open application.

The above described prior art film tubing device has a drawback that the film 104 may unexpectedly melt or shrink upon stoppage in transfer of the film 104 when, for example, a new article to be packaged does not come into the former 100 for some reason. More specifically, the outer former member 102 is always at an elevated temperature by being exposed to the heat of the rollers 106, so that upon stoppage in transfer of the film 104 a particular portion thereof is kept in contact with the heated outer former member 102 for a time period enough to melt or shrink the film 104. Such unexpected melting or shrinkage of the film 104 not only causes a waste thereof but also poses a trouble in re-starting a normal film tubing operation.

One way to overcome the above problem is to move the heat rollers 105 to locations laterally outwardly of the former 100 upon stoppage in transfer of the film 104. However, a mechanism required for moving the rollers 105 in this way becomes inevitably complicated and thus costly because the rollers 105 are already connected to their own rotary drive mechanism as described hereinbefore.

Another way conceivable to eliminate the above problem of the prior art film tubing device is to interpose an insulator panel between the outer former member 102 and each roller 105. Naturally, such an insulator panel must have a sufficient thickness to ensure intended heat insulation, so that the spacing between the outer former member 102 and each roller 105 must be correspondingly large for interposition of the insulator panel. Thus, this countermeasure gives rise to a new disadvantage that the length of the overlapping side edges 104a of the film 104 becomes unacceptably large, which results in poor packaging.

A film tubing device which is similar in arrangement and problem is also disclosed in Japanese Utility Model Laid-open No. 57-67903 (Laid-open: April 23, 1982; Application No. 55-143494; Filed: Oct. 7, 1980; Applicant: Ibaragi Seiki Kabushiki Kaisha; Inventor: Sen SUGA).

SUMMARY OF THE INVENTION

It is, therefor, an object of the present invention to provide a film tubing device which is simple in construction but yet free of unexpected melting or shrinkage, within a tube former, of a tube forming film even upon stoppage in transfer thereof.

Another object of the invention is to provide a film tubing device in which each longitudinal sealer is minimally spaced from the tube former.

According to the invention, there is provided a film tubing device for use in a packaging apparatus comprising a tube former arranged in a transfer path of a continuous length of a heat-meltable film having a pair of longitudinal side edges, the former including an inner former member on which the film is wrapped with the side edges overlapping each other, the former further including an outer former member having a longitudinal outlet through which the overlapping side edges project out, a pair of longitudinal sealers disposed adjacent to the longitudinal outlet as slightly spaced from the outer former member for nipping the overlapping side edges, at least one of the sealers being heated for heat-sealing the overlapping side edges together, a thin air guide plate arranged between the outer former member and at least said one of the sealers to define a clearance between the guide plate and the outer former member, and air supplying means for feeding cooling air into the clearance.

Other objects, features and advantages of the invention will become apparent from the following detailed description given with reference to the accompanying drawings.

DESCRIPTION OF THE PREFERRED EMBODIMENT

Figure 1:
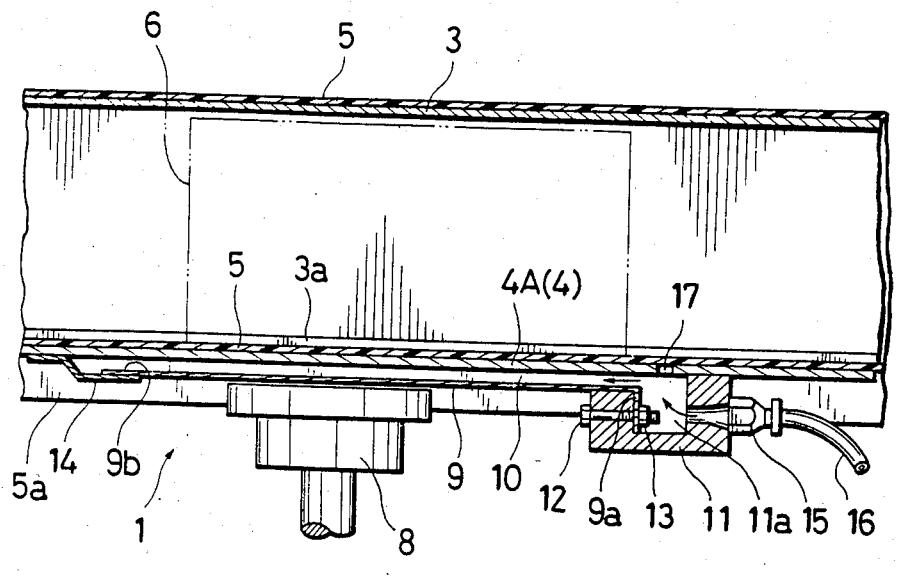
FIG. 1 is a fragmentary side view, in longitudinal section, of a film tubing device embodying the invention.
Figure 2:
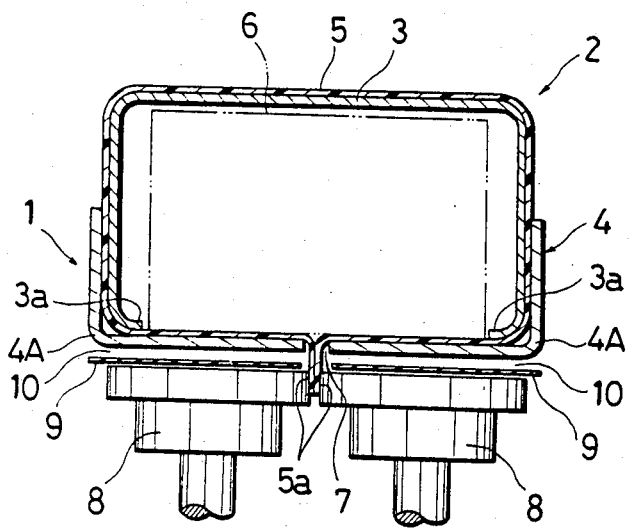
FIG. 2 is a front view, in transverse section, of the film tubing device in a state of normal film tubing operation.

Referring now to FIGS. 1 and 2 of the accompanying drawings, a film tubing device generally represented by reference numeral 1 is illustrated as having a tube former 2 which includes an inner former member 3 and an outer former member 4. A continuous length of a heat-meltable, heat shrinkable film 5 is paid out from an unillustrated roll of such film and transferred through the tubing device 1 by a transfer device (not shown) together with articles 6 (only one shown) to be packaged.

As better appreciated from FIG. 2, the inner former member 3 is in the form of a channel member having a pair of mutually spaced, inturned longitudinal edges 3a at its lower corners. The film 5 is intimately wrapped around the inner former member 3 with its longitudinal side edges 5a overlapping each other while it advances on the inner former member 3.

Each article 6 is positioned between the inturned longitudinal edges 3a as it moves forward within the inner former member 3.

According to the illustrated example, the outer former member 4 comprises a pair of angle plates 4A which are transversely spaced to define a longitudinal outlet 7. The overlapping longitudinal side edges 5a of the film 5 project out downward through this outlet.

The purpose of the outer former member 4 is to shape the portions of the film 3 which extend transversely inward beyond the inturned longitudinal edges 3a of the inner former member 3, and to provide a support for the article 6. Naturally, the outer former member 4 may be in the form of an integral rectangular tube having a similar longitudinal outlet.

Directly below the outer former 4 are a pair of longitudinal sealers 8 which are illustrated as being in the form of rollers for nipping therebetween the overlapping longitudinal side edges 5a of the film 5. According to the illustrated example, each of the sealing rollers 8 has an embedded heater (not shown). One or both of the rollers 8 may be forcibly rotated by a drive mechanism (not shown).

Each of the sealing rollers 8 is slightly spaced from the outer former member 4. Such spacing should be minimal because otherwise the overlapping longitudinal side edges 5a of the film 5 must project downward to an excessive extent in order to be nipped between the rollers 8. Preferably, the spacing may be in the order of 1 mm though variable within a certain range.

Figure 4:
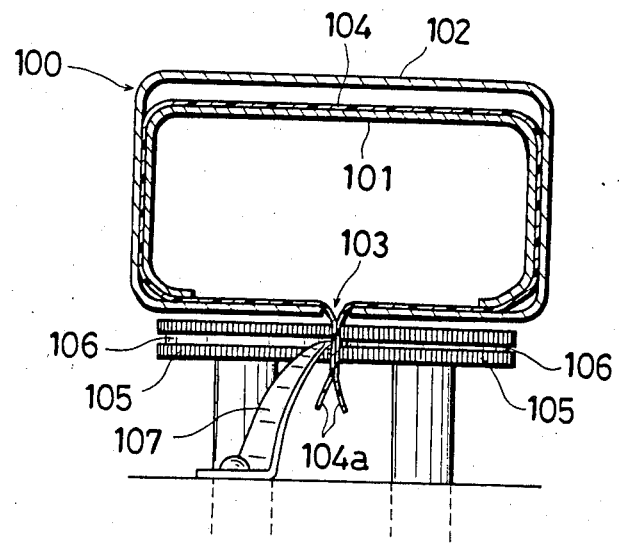
FIG. 4 is a front view, in transverse section, of a prior art film tubing device.

If desired, sealing rollers of a different type such as shown in FIG. 4 may also be used without inviting any disadvantages.

A thin air guide plate 9 is disposed between the outer former member 4 and each sealing roller 8. Thus, a small clearance 10 is formed between the outer former member 4 and the guide plate 9.

As apparent from FIG. 1, the air guide plate 9 is supported at its rear end by a holder 11 fixed by any suitable means (not shown) to the underside of each angle plate 4A. More specifically, the rear end of the guide plate 9 is provided with a downwardly bent portion 9a which is fastened to the holder 11 by a bolt 12 and a nut 13.

The other end (front end) 9b of the air guide plate 9, on the other hand, is supported by a support member 14 which is also fixed by any suitable means (not shown) to the underside of the corresponding angle plate 4A.

The air guide plate 9 thus supported at both ends thereof will not flex under its own weight even if it is extremely thin. According to the illustrated example, the guide plate 9 is made of iron and has a wall thickness of 0.3 mm. However, the material and thickness of the guide plate 9 are optional with certain limitations (mechanical strength, etc).

The holder 11 is formed with a recess 11a which serves as an air chamber communicating with the corresponding clearance 10. The air chamber 11a further communicates with a compressed air nozzle 15 mounted to the holder 11 and connected through a flexible hose 16 to a compressor (not shown).

Each angle plate 4A of the outer former member 4 is formed with a perforation 17 immediately above the air chamber 11a of the holder 11 in communication therewith. The purpose of the perforation 17 will be described hereinafter.

In normal operation of the film tubing device 1 having the above arrangement, the moving continuous film 5 is formed into a tubular shape by the former 2, and the overlapping longitudinal side edges 5a of the film 5 which are nipped between the pair of heated sealing rollers 8 are heat-sealed along a longitudinal seal line. As a result, the article 6 is enclosed by a tube of the film 5. During such operation, no air is supplied to the holder 11 nor to the clearance 10.

When the article 6 has completely passed through the former 2 together with a portion of the film 5 enclosing it, such film portion is transversely heat-sealed and cut at two positions slightly ahead of and behind the article 6 by a known transverse sealing/cutting device (not shown), whereby a film bag (not shown) completely enveloping the article is obtained. The film bag is subsequently exposed to hot air in a known manner and thereby caused to shrink into close contact with the article 6 inside. Thus, a complete package of the article is obtained.

If, for some reason, a new article to be packaged does not come into the former 2, transfer of the continuous film 5 is stopped to avoid waste of the film. This, however, causes a particular portion of the non-moving film 5 on the outer former member 4 to be heated continuously by the heat from the sealing rollers 8. Thus, if no counter measure is taken, such film portion will ultimately shrink or melt to invite troubles in restarting a film tubing operation.

According to the present invention which has eliminated the above problem, compressed cooling air is fed through the nozzle 15 into the air chamber 11a of the holder 11 and further into the clearance 10 to cool the outer former member 2, thereby preventing the film 5 from being locally heated.

Figure 3:
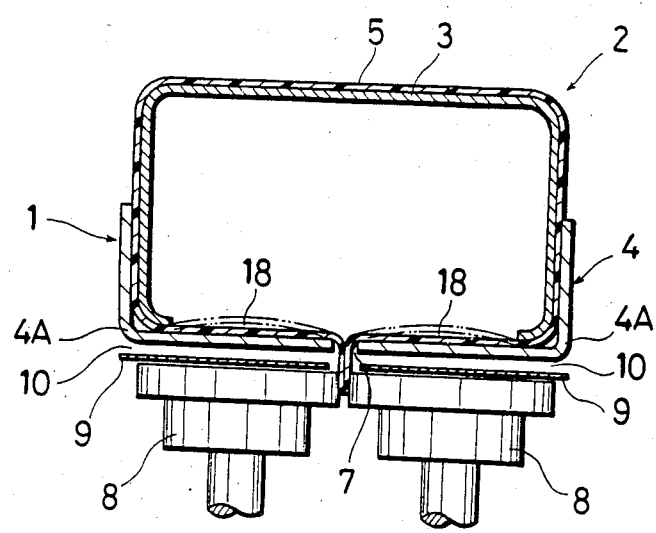
FIG. 3 is a view similar to FIG. 2 but illustrating the film tubing device in a cooling state.

On the other hand, a part of the compressed cooling air supplied into the air chamber 11a passes through the perforation 17 of each angle plate 4A to enter between the angle plate 4A and the film 5, causing the film 5 to bulgingly deform above the angle plate 4A and thereby to form an air layer 18 as indicated in phantom lines in FIG. 3. Naturally, the air layer 18 not only serves to cool the angle plate 4A (outer former member 4) but also blocks heat transmission from the outer former 4 to the film 5. As a result, the film 5 becomes virtually free of any adverse influences by the heated rollers 8.

If desired, compressed cooling air may also be supplied continuously or intermittently during normal film tubing operation.

The invention being thus described, it will be obvious that the same may be varied in many ways. For example, a single air guide plate may be used which is disposed between only one of the sealing rollers 8 and the corresponding angle plate 4A in case the other sealing roller is of non-heating type. Further, the sealing rollers 8 may be positioned above the former 2 for sealing the overlapping longitudinal side edges 5a of the film 5 which, in this case, project upward. Such variations are not to be regarded as a departure from the spirit and scope of the invention, and all such modifications as would be obvious to those skilled in the art are intended to be included within the scope of the following claims.

I claim:

1. A film tubing device for use in a packaging apparatus, comprising:
    a tube former arranged in a transfer path of a continuous length of a heat-meltable film having a pair of longitudinal side edges,
    said former including an inner former member on which said film is wrapped with said side edges overlapping each other,
    said former further including an outer former member having a longitudinal outlet through which said overlapping side edges project out,
    a pair of longitudinal sealers disposed adjacent to said longitudinal outlet as slightly spaced from said outer former member for nipping said overlapping side edges,
    at least one of said sealers being heated for heat-sealing said overlapping side edges together,
    a thin air guide plate arranged between said outer former member and at least said one of said sealers to define a clearance between said guide plate and said outer former member, and
    air supplying means for feeding cooling air into said clearance.

2. The film tubing device as defined in claim 1, wherein
    said air guide plate is supported at one end by a holder fixed to said outer former member and at the other end by a support member also fixed to said outer former member.

3. The film tubing device as defined in claim 2, wherein
    said air supplying means comprises a compressed air nozzle which is connected to said holder, and said holder is formed with a recess serving as an air chamber which communicates with said clearance.

4. The film tubing device as defined in claim 3, wherein
    said outer former member is provided with a perforation which communicates with said air chamber.

5. The film tubing device as defined in claim 1, wherein
    said air guide plate has a wall thickness of 0.3 mm.

6. The film tubing device as defined in claim 1, wherein
    said inner former member is in the form of a channel member with its open side directed downward, and
    said outer former member comprises a pair of angle plates which are arranged to cover said open side of said channel member and which are spaced from each other to define said longitudinal outlet.

* * * * *